Sept. 30, 1969 W. G. MULLEY 3,469,559
SETTABLE DIAL INDICATOR
Filed May 31, 1967
Fig. 1a
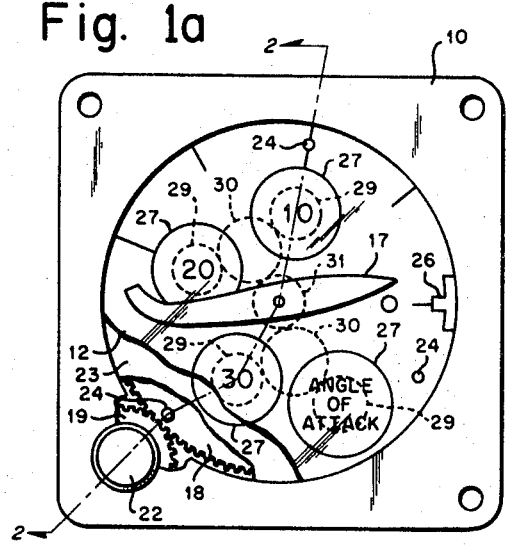
Fig. 1b
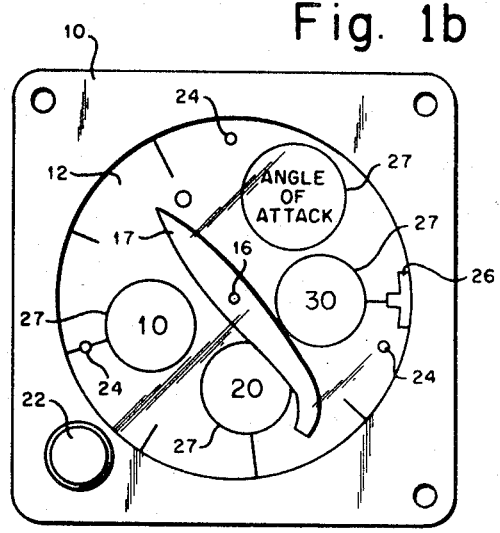
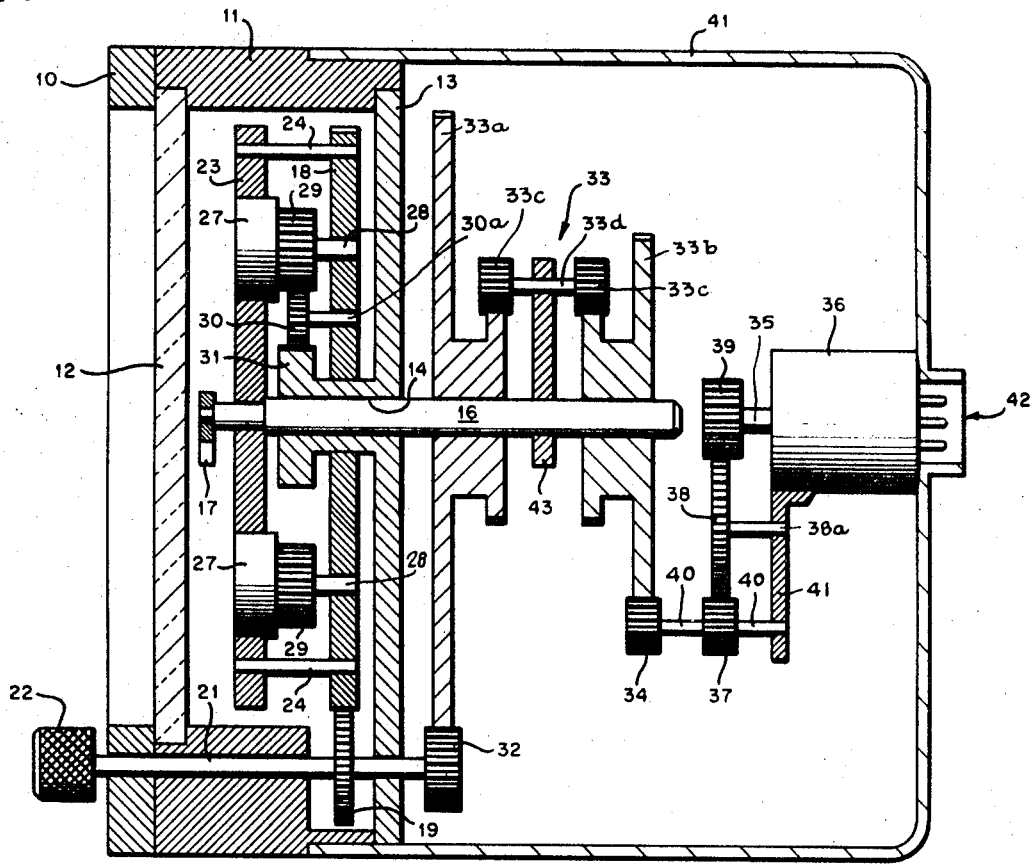
Fig. 2
INVENTOR.
WILLIAM G. MULLEY
BY
ATTORNEY

United States Patent Office 3,469,559
Patented Sept. 30, 1969

3,469,559
SETTABLE DIAL INDICATOR
William G. Mulley, Warminster, Pa., assignor to the United States of America as represented by the Secretary of the Navy
Filed May 31, 1967, Ser. No. 643,320
Int. Cl. G09f 9/00
U.S. Cl. 116—129     8 Claims

ABSTRACT OF THE DISCLOSURE

An angle of attack indicator for an aircraft having a circular, graduated scale, main dial which can be manually set in the plane thereof to any orientation while maintaining the symbology in constant orientation. At cardinal points in the graduated scale, smaller dials indicating the corresponding angle of attack or other alpha or numeric symbology are flush-mounted in the main dial and rotatable by a planetary gear arrangement at the same angular rate as the main dial but in the opposite direction. Another differential gear arrangement enables rotation of the indicator pointer with adjustment of the main dial or independently thereof with changes in aircraft angle of attack. Thus, the symbology on the smaller dials can be initially set and remain in constant orientation for optimum readability.

Statement of Government interest

The invention described herein may be manufactured and used by or for the Government of the United States of America for governmental purposes without the payment of any royalties thereon or therefor.

Background of the invention

Instrument panels used in conjunction with machinery and processes frequently include large arrays of dial indicators for displaying different operating conditions. In such arrays it is desirable that all of the dials be set with the indicia of the normal or desired operating value located in the same position. For example, in an aircraft instrument panel, the three o'clock position has been found most acceptable. In order to make one type of dial indicator universally adaptable for such orientation regardless of the normal or desired operating condition of the process or apparatus involved, the dial must be made adjustable. However, when adjusted to a desired orientation, the alpha or numeric symbols on the dial may become so disoriented as to make the indicator difficult to read at a quick glance under urgent conditions. The need for affording rapid reading of dial indicators is particularly present in piloting high performance aircraft.

Summary of the invention

Accordingly, it is a general purpose of the present invention to provide an indicator having a dial face plate which can be rotated to any desired position while maintaining the alpha or numeric symbols in their most readable orientation. This is accomplished by interconnecting the dial face plate, an external adjusting knob and flush-mounted alpha or numeric dial elements through a planetary gear arrangement. The gear ratios are appropriately selected to insure that the dial elements counter-rotate degree-for-degree with rotation of the dial face plate. A differential gear arrangement is also included to insure that the pointer of the indicator rotates with the dial face plate during adjustment while maintaining response to changes in the phenomenon indicated.

Brief description of the drawing

In the drawing:
FIGS. 1a and 1b represent front views of an angle of attack indicator according to the invention, the dial face plate being adjusted to different settings in the respective figures while the indicator pointer indicates the same angle of attack; and
FIG. 2 represents a longitudinal cross-section of the indicator taken along the line 2—2 of FIG. 1.

Description of the preferred embodiment

Referring now to FIG. 1, a dial indicator according to the invention is illustrated in the form of an aircraft angle of attack indicator. Of course, it is understood that the inventive concept is not limited to indicating any particular condition or phenomenon.

The indicator includes a front mounting plate 10 having an enlarged opening and formed to be secured on an instrument panel. An indicator casing 11 is affixed on the back of the plate 10 around the opening. A transparent plate 12 is secured at the opening between the plate 10 and the casing 11. A bearing member 13 fixed to the casing 11 in spaced relation behind the transparent plate 12 includes a journal bearing 14 rotatably supporting a pointer shaft 16 on an axis normal to the plate 12. An indicator pointer 17 is affixed to the end of the shaft 16 adjacent to the plate 12 and is rotatable therewith. A planet gear carrier 18 rotatable relative to the bearing member 13 and pointer shaft 16 includes peripheral gear teeth which are drivingly engaged with a spur gear 19. A shaft 21 coaxially fixed to the gear 19 rotatably extends through the housing 11 and frame 10 to the front of the indicator where it terminates in an external knurled adjusting knob 22. A dial face plate 23 positioned immediately behind the pointer 17 on the shaft 16 for rotation relative thereto is held in fixed relation to the carrier 18 by pins 24. The front surface at the outer periphery of the dial face plate 23 is planar and inscribed or imprinted with a graduated scale indicative of phenomenon to be indicated, such as angle of attack. Thus, the face plate 23 can be oriented relative to the housing 11 by the knob 22 to any desired angular position. In the illustrated example, a reference mark 26 inscribed or imprinted on the transparent plate 12 at the three o'clock position is used to align a desired or normal value on the face plate 23 thereat.

In order that alpha or numeric symbology such as labels or values at cardinal points along the graduated scale remain in their most readable orientation regardless of the rotation of the face plate 23, the symbology is imprinted or inscribed on individual dial elements 27 which, in turn are rotatably supported in the face plate 23 at positions dictated by the position of the cardinal points and the available dial space. These elements are mounted with their front surfaces flush with the front surface of the face plate 23. For the angle of attack indicator, four dial elements 27 are illustrated having inscribed on the front surfaces thereof the numbers 10, 20 and 30, and the legend "Angle of Attack," respectively. Each dial element 27 is axially fixed to a shaft 28 for rotation therewith, the distal end of the shaft 28 being journaled in the carrier 18. A dial element gear 29 fixed to each shaft 28 between the dial element 27 and the carrier 18 is drivingly connected through a planet gear 30 fixed on shaft 30a which rotates in carrier 18. The gear 30, in turn, is drivingly connected to a sun gear 31 fixed to the bearing member 13 and coaxial with pointer shaft 16. The planet gears 29 are each rotatable about shafts 28 extending from the bearing member 13 on axes parallel to the shaft 16. The gear ratios are selected to insure that any amount of face plate rotation relative to the plate 10 caused by rotation of knob 22 will produce an equal but opposite amount of rotation of the dial elements 27 relative to plate 23, thereby maintaining constant orientation of the alpha or numeric symbology on the dial elements 27 relative to the plate 10 regardless of the orientation of the face plate 23 relative to the plate 10.

The indicator pointer 17 and shaft 16 are angularly positioned in response to rotation of the adjusting knob 22 or variations in the phenomenon to be measured. In the first instance, shaft 21 extends rearwardly through bearing member 13 and terminates with a spur gear 32 fixed thereto for rotation therewith. The gear 32 drivingly connects to one input sun gear 33a, rotatable on shaft 16 of a differential gear assembly indicated generally by the numberal 33. The other input sun gear 33b, rotatable on shaft 16, of the assembly 33 is connected to a spur gear 34 which is drivingly connected to the output shaft 35 of a servo motor 36 through a transmission including gears 37, 38 and 39 and shafts 40 and 38a. Gears 34 and 37 are fixed to shaft 40 which, in turn, is rotatable in motor housing extension 41. Gear 38 is rotatable on shaft 38a which, in turn, is fixed to extension 41. Gear 39 is fixed to shaft 35. The servo motor 36 is fixed relative to the indicator housing 11 by means of an indicator casing 41 and is appropriately energized through an electrical fitting 42. The differential gear assembly 33 is drivingly connected through its planet gears 33c fixed on shaft 33d to its output by a carrier 43 fixed to the shaft 16 for rotation therewith. Shaft 33d is rotatable in carrier 43. By maintaining gears 33b and 34 stationary, such as by zero rotation of motor 36, and by rotating knob 22, sun gear 33a and pilot gears 33c will rotate. Planet gears 33c will also orbit about the sun gears 33a and 33b causing rotation of carrier 43, shaft 16 and pointer 17. Similarly, rotation of gears 33b and 34 such as by rotation of motor 36 while gear 33a remains stationary will cause planet gears 33c to rotate and orbit, causing rotation of pointer 17. Simultaneous rotation of gears 32 and 34 will cause planet gears 33c to orbit and pointer 17 to rotate an amount proportional to the algebraic sum of the angular rotations of gears 32 and 34. The gear ratios between adjusting knob 22 and pointer 17, and knob 22 and carrier 18 must be such as to cause concomitant rotation. Thus, adjustment of the dial face plate will not disturb the indicator calibration.

Some of the many advantages of the invention should now be apparent. The symbology imprinted or inscribed on a dial indicator can be maintained in an upright, easily readable orientation irrespective of the orientation of the dial face. A universal dial indicator can be manufactured for a given phenomenon and applied to many different processes or situations. For example, a single angle of attack indicator as described hereinabove can be used in many variations of aircraft whose instruments are all oriented to indicate normal or desired operating conditions at the three o'clock position and still maintain the symbology upright. This design philosophy is particularly important for optimum pilot efficiency in high performance aircraft.

It will be understood that various changes in the details, materials, steps and arrangement of parts, which have been herein described and illustrated in order to explain the nature of the invention may be made by those skilled in the art within the principle and scope of the invention.

I claim:

1. An indicator comprising:
   means for providing structural support;
   means rotatably mounted in said support means having a continuously exposed planar dial face inscribed with graduations for indicating a range of values of phenomenon and having an opening at a selected graduation;
   means rotatably mounted in said opening in said indicating means and having a continuously exposed planar dial face inscribed with a symbol flush with the dial face of said indicating means for identifying the selected graduation;
   means drivingly connected between said identifying means and said support means for rotating said identifying means relative to said indicating means in equal and opposite degrees with rotation of said indicating means relative to said support means thereby maintaining constant orientation of the symbol relative to said support means; and
   means rotatably mounted in said support means and drivingly connected to said indicating means for adjusting said indicating means relative to said support means.

2. An indicator according to claim 1 further comprising:
   means adjacent to the dial face of said indicating means and rotatably mounted in said support means coaxially with said indicating means for pointing to the graduations.

3. An indicator according to claim 2 further comprising:
   means operatively connected to said pointing means for positioning said pointing means in response to variations in the phenomenon to be indicated.

4. An indicator according to claim 3 wherein said positioning means includes:
   means adapted to receive an electrical signal indicative of the phenomenon to be indicated for converting the signal to a proportional output shaft angle position; and
   differential means having one input operatively connected to the output shaft of said converting means, another input operatively connected to said adjusting means, and an output operatively connected to said pointing means.

5. An indicator according to claim 1 wherein said rotating means includes:
   a sun gear fixed to said support means coaxially with said indicating means;
   a planet gear rotatably mounted in said indicating means and drivingly connected to said sun gear; and
   an element gear coaxially fixed to said symbol means for rotation therewith and drivingly connected to said planet gear.

6. An indicator according to claim 5 further comprising:
   means adjacent to the dial face of said indicating means and rotatably mounted in said support means coaxially with said indicating means for pointing to the graduations.

7. An indicator according to claim 6 further comprising:
   means operatively connected to said pointing means for positioning said pointing means in response to variations in the phenomenon to be indicated.

8. An indicator according to claim 7 wherein said positioning means in includes:
   means adapted to receive an electrical signal indicative of the phenomenon to be indicated for converting the signal to a proportional output shaft angle position; and
   differential means having one input operatively connected to the output shaft of said converting means, another input operatively connected to said adjusting means, and an output operatively connected to said pointing means.

(References on following page)

References Cited

UNITED STATES PATENTS

| | | | |
|---|---|---|---|
| 2,217,633 | 10/1940 | Wunsch | 116—129 X |
| 2,934,743 | 4/1960 | Dayton et al. | 73—178 X |
| 3,033,035 | 5/1962 | Snodgrass | 116—129 X |
| 3,060,405 | 10/1962 | Buon | 73—178 X |
| 3,105,731 | 10/1963 | Bertrang | 116—129 X |
| 3,135,122 | 6/1964 | Pierce | 116—129 X |

FOREIGN PATENTS 566,663  1/1945  Great Britain.

LOUIS R. PRINCE, Primary Examiner

DANIEL M. YASICH, Assistant Examiner

U.S. Cl. X.R.

73—178